(No Model.) 8 Sheets—Sheet 1.

S. H. FISH.
POTATO PLANTER.

No. 414,148. Patented Oct. 29, 1889.

Witnesses.
Andrew Crawford
Henry C. Middaugh

Inventor.
Samuel H. Fish.
By. George P. Barton
Attorney.

(No Model.)

S. H. FISH.
POTATO PLANTER.

No. 414,148.  Patented Oct. 29, 1889.

Witnesses.
Andrew Crawford
Henry C. Middaugh

Inventor.
Samuel H. Fish.
By. George R. Barton
Attorney.

(No Model.) 8 Sheets—Sheet 4.
S. H. FISH.
POTATO PLANTER.

No. 414,148. Patented Oct. 29, 1889.

Witnesses.
Andrew Crawford
Henry C. Middaugh

Inventor.
Samuel H. Fish.
By George P. Barton
Attorney.

N. PETERS, Photo-Lithographer, Washington, D. C.

(No Model.)  8 Sheets—Sheet 5.

S. H. FISH.
POTATO PLANTER.

No. 414,148. Patented Oct. 29, 1889.

Witnesses.
Andrew Crawford
Henry C. Middaugh

Inventor.
Samuel H. Fish.
By George R. Barton
Attorney.

(No Model.) 8 Sheets—Sheet 6.

S. H. FISH.
POTATO PLANTER.

No. 414,148. Patented Oct. 29, 1889.

Witnesses.
Andrew Crawford
Henry C. Middaugh

Inventor.
Samuel H. Fish.
By. George R. Borton
Attorney.

(No Model.)   8 Sheets—Sheet 7.

S. H. FISH.
POTATO PLANTER.

No. 414,148. Patented Oct. 29, 1889.

Witnesses.
Andrew Crawford
Henry C. Middaugh

Inventor.
Samuel H. Fish,
By George R. Barton
Attorney.

(No Model.) 8 Sheets—Sheet 8.

S. H. FISH.
POTATO PLANTER.

No. 414,148. Patented Oct. 29, 1889.

Witnesses.
Andrew Crawford
Henry C. Middaugh

Inventor.
Samuel H. Fish.
By George P. Barton
Attorney.

UNITED STATES PATENT OFFICE.

SAMUEL H. FISH, OF HINSDALE, ASSIGNOR OF ONE-HALF TO HENRY C. MIDDAUGH, OF CLARENDON HILLS, ILLINOIS.

POTATO-PLANTER.

SPECIFICATION forming part of Letters Patent No. 414,148, dated October 29, 1889.

Application filed November 8, 1884. Serial No. 147,456. (No model.)

*To all whom it may concern:*

Be it known that I, SAMUEL H. FISH, a citizen of the United States, residing at Hinsdale, in the county of Du Page and State of Illinois, have invented a certain new and useful Improvement in Potato-Planters, of which the following is a full, clear, concise, and exact description, reference being had to the accompanying drawings, forming a part of this specification.

My invention relates to potato-planters which are designed to be drawn by horse-power and drop the potatoes in drills. A machine of this character is shown in my patent, No. 265,225, granted September 26, 1882. In my machine herein described I use the same cylinder and forks, the disks, and the block for clearing the disks therein described and claimed. I have, however, introduced certain improvements into the dropping mechanism, which consist in adapting a single reciprocating slide to do the work of the two reciprocating slides described in my said patent; in providing the sprocket-wheels and endless chain whereby power is transferred from the main shaft to the reciprocating slide; in providing an agitator or plate which is turned automatically behind the different tongues as they are successively extended, so as to enlarge the different pockets and stir up the potatoes as the pockets come up in position to be filled; in giving the cam which controls the tongues a movement which draws in the tongue of the pocket that has been filled before the cylinder begins to move at each step, and at the same time turning back the agitator, thus clearing the cylinder, and in providing a dog or detent which holds the cylinder from turning in either direction as long as it remains in engagement with the cylinder, but which is lifted automatically at the right moment so as to release the cylinder.

My improvements further consist in providing a bell-crank lever operated by a cam for throwing the sprocket-wheel on the main shaft out of gear, in providing a shoe which may be raised and lowered positively at the will of the user, and in providing means for raising and lowering the scrapers or shovels.

My improvements further consist in certain details of construction and combinations of parts, which will be hereinafter more fully described.

As hereinafter described, it will be seen that the user, as he sits upon the machine, may, by drawing back upon the main lever placed within his reach, throw the machine out of gear and lift the shoe and shovels, so that the machine may be drawn from place to place, as desired. By moving the main lever forward again the machine may be brought into working position.

In the drawings, which are illustrative of my invention, Fig. 1$^a$ is a side elevation of the machine in position for work.

Figures 3, 4, 5:
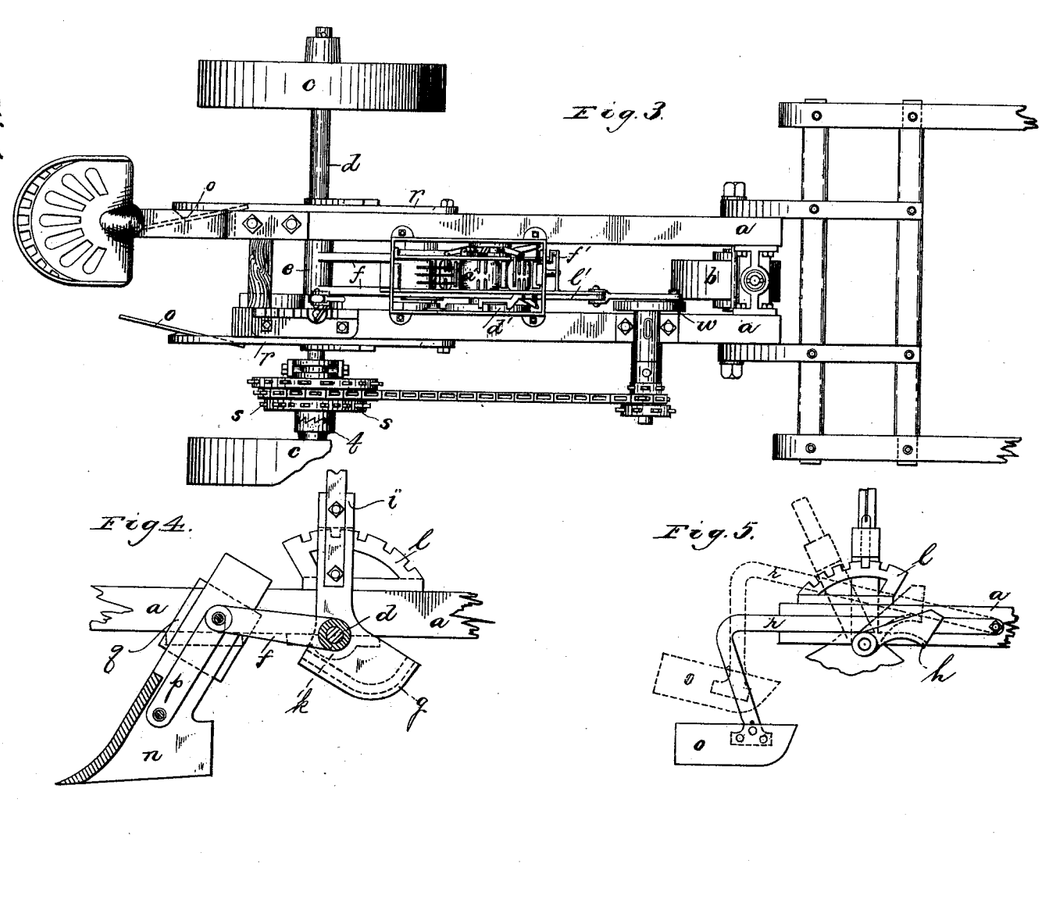
Fig. 3 is a plan view of the machine.
Fig. 4 is a detailed view of the mechanism for lifting the shoe.
Fig. 5 is a detailed view of the mechanism for lifting the scrapers, the dotted lines showing the scrapers raised.

The frame $a$ of the machine may be of scantling, say two inches by three and one-fourth inches. In the machine which I have constructed the beams are four feet long and five and three-fourths inches apart. This frame carries all the working parts of the machine, and is supported by the front or caster wheel *b* and the hind wheels *c c*. These wheels are mounted upon the main shaft *d*. The sleeve *e* is secured rigidly to the shaft and provided with the arms *f*, the cam *g*, the curved pieces *h*, and the socket or lug *i*, whereby the lever is secured to the sleeve upon the shaft. The sleeve *e*, arms *f*, cam *g*, curved pieces or levers *h*, and socket *i* are connected together, so that they may all move simultaneously as the lever is forced forward or backward. The shaft, as shown in Fig. 4, is supported by boxes *k*, which are bolted to the frame. The segment *l* is provided with notches, with which the detent *m* engages, so that the main lever may be held in any desired position.

Figures 7, 9:
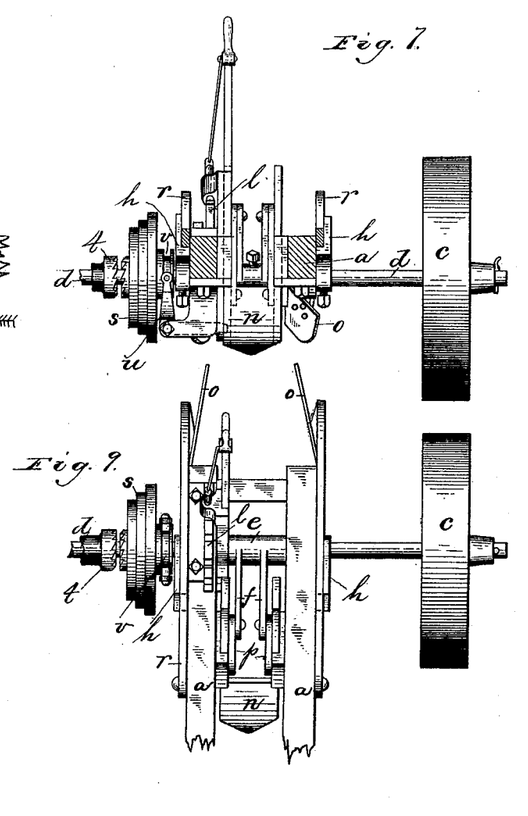
Fig. 7 is a detailed view thereof as seen from section-line $y\ y$ of Fig. 6.
Fig. 9 is a plan view of the mechanism shown in Fig. 7.
Figure 14:
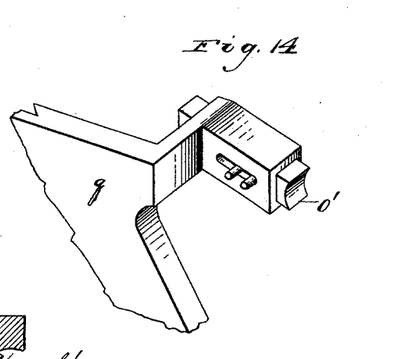
Fig. 14 is a perspective view of a portion of the supporting-casting for the shoe and the dog in the bearing provided therefor upon said casting.

I will now describe the manner in which the shoe *n* and the scrapers or shovels *o* are lifted and the dropping mechanism of the machine thrown out of gear by the movement of the lever. The arms *f* are pivoted to the arms *p*, as shown in Figs. 4 and 9. These arms *p* are pivoted near their lower ends to the shoe. The shoe may thus be moved positively up and down in the bearing or support formed by the casting *q*, which is bolted to the frame. A detailed view of a portion of the casting *q* is shown in Fig. 14.

Figure 6:
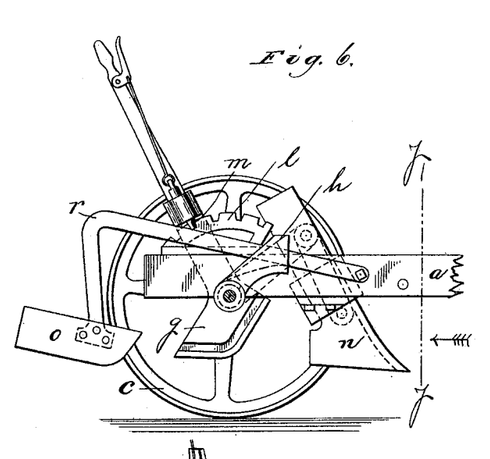
Fig. 6 is a detailed side elevation showing the lever thrown back and the shoe and scrapers lifted from the ground.

The scrapers or shovels *o o*, which serve to cover the potatoes, are carried by the levers or arms *r*, which are pivoted to the frame, as shown in Figs. 5 and 6. The curved pieces or levers *h* support the arms *r*, respectively. A lug is provided on each of the curved levers above the different arms, serving to keep the scrapers or shovels from being thrown up by coming against sods or other obstructions.

I will now describe the mechanism for throwing the dropping mechanism in and out of gear.

Figure 2:
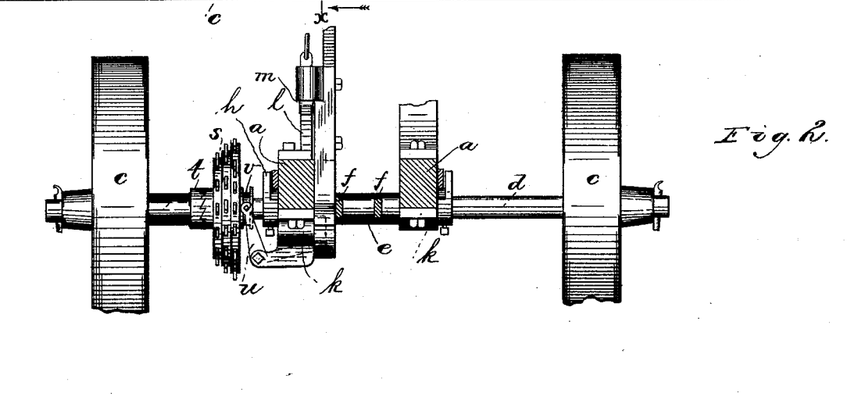
Fig. 2 is a sectional view as indicated by the sectional line $x\ x$ of Fig. 1$^a$.
Figure 8:
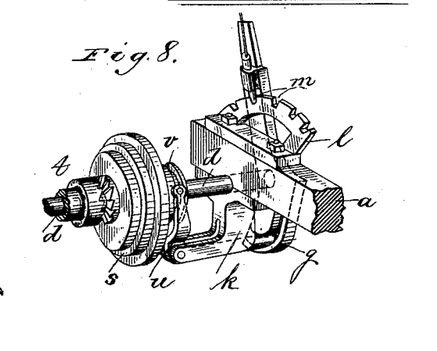
Fig. 8 is a detailed perspective of the mechanism for throwing the machine in and out of gear by the lever.

The dropping mechanism is operated by power derived from the sprocket-wheel *s*, which is carried on the main shaft. The sprocket-wheel will be turned with the wheels *c* as long as it remains in engagement with the clutch *t*. When the sprocket-wheel is disengaged from the clutch, it will remain at rest upon the shaft, so that the machine may be driven from place to place without operating the dropping mechanism. The means which I have provided for throwing the sprocket-wheel in and out of engagement with the clutch consists of the cam *g*, the bell-crank lever *u*, and the groove *v*, provided in the hub of the sprocket-wheel, as shown in Figs. 2, 8, and 9. The sprocket-wheel is thus thrown out of engagement, while the shoe and the scrapers are lifted as the lever is drawn back.

It is evident that the bell-crank lever for throwing the sprocket-wheel out of gear might be operated by means distinct from the lever which operates to raise and lower the shoe and the scrapers, and in like manner the shoe or the scrapers might be raised and lowered by independent mechanism. I prefer, however, to use the lever, as shown, to serve three different functions at the same time—that is to say, to raise or lower the shoe and the shovels, and at the same time to throw the sprocket or other driving-wheel out of and into gear. The endless chain may be adjusted to the different sprocket-wheels so as turn the crank-pulley *w* at different rates of speed. To this crank-wheel is attached a pitman, which is connected with the reciprocating slide of the dropping mechanism.

Having thus described the manner in which the machine is thrown in and out of gear and the means for raising and lowering the shoe and the shovels, I will now proceed to describe in detail the dropping mechanism.

My machine is designed to drop the potatoes, little and big mixed together, in hills at nearly uniform distances apart.

I intend to perfect mechanism for planting hills in check-rows; but my machine, as herein described, is only designed for planting in drills. The rows may, however, be planted at any distance apart, and the distance between the hills in the row may be regulated, since one hill is planted at each revolution of the crank-wheel—that is to say, at each step of the cylinder. The potatoes are placed in the hopper above the dropping mechanism, so as to fall into the pockets provided in the cylinder *a'*. The cylinder is provided with any convenient number of pockets. In the machine which I have constructed I have provided eight pockets in the cylinder. The cylinder carries a series of tongues *b'*, which are extended and drawn in successively by means of levers *c'* and a cam *d'*. I also provide series of forks which are carried by levers pivoted to lugs on the different ends of the cylinder, said levers being operated by fixed cams, as described and claimed in my previous patent. The cam *d'* is shown in detail in Fig. 18 and the means whereby said cam is given a movement while the cylinder is at rest for the purpose of withdrawing the tongue behind the pocket that has just been filled. The mechanism for successively withdrawing the tongues at the right moment by turning cam *d'* a short distance upon its axis will be hereinafter fully described.

Figure 1:
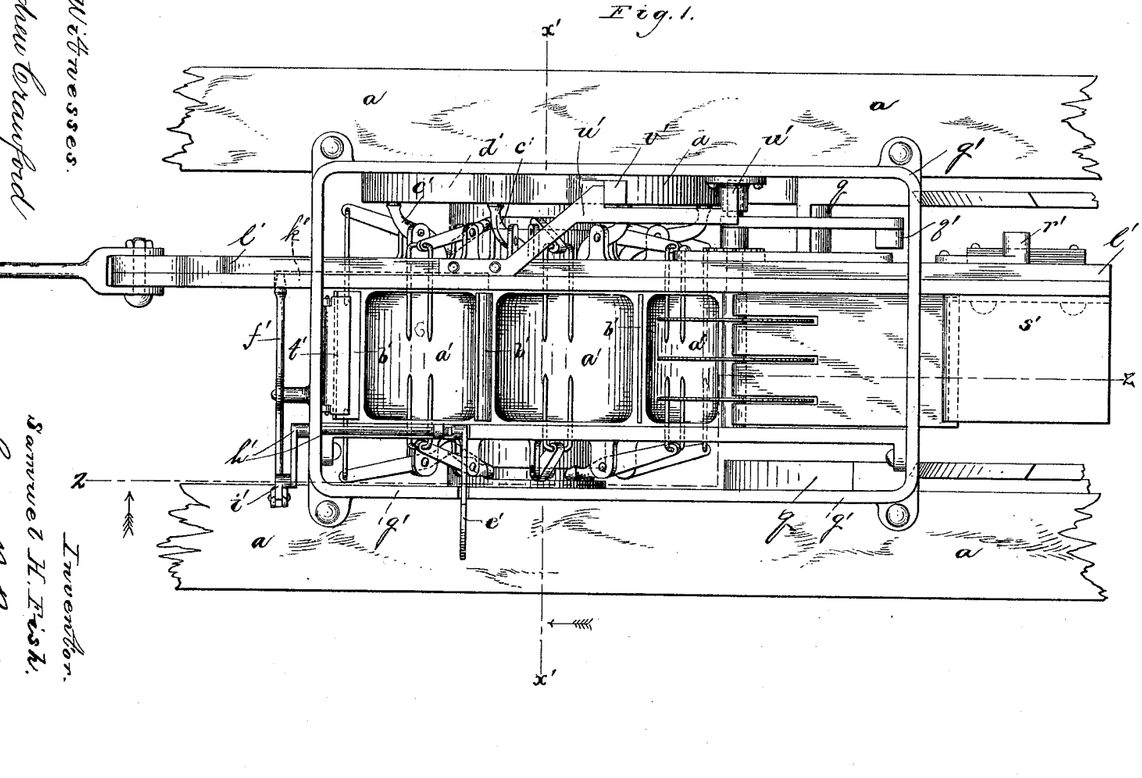
Figure 1 is a plan view with the hopper removed, showing the dropping mechanism.
Figure 10:
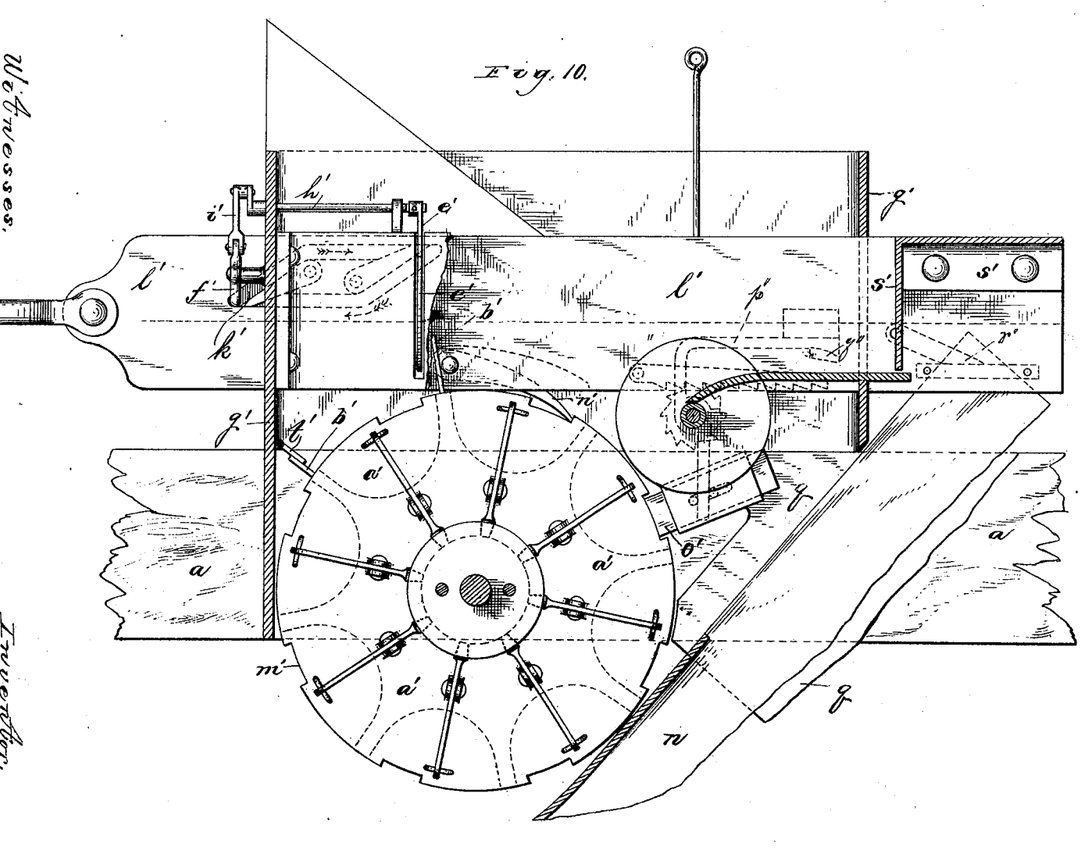
Fig. 10 is an enlarged sectional view on line $z\ z$ of Fig. 1.
Figure 11:
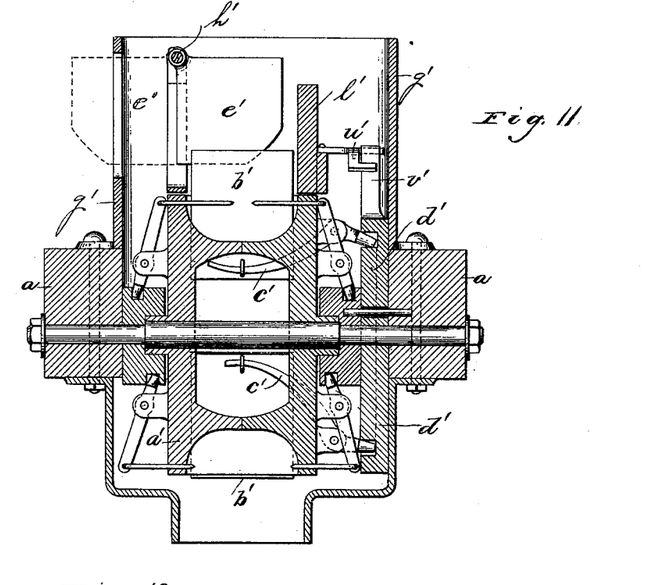
Fig. 11 is a vertical transverse section on line $x'\ x'$ of Fig. 1.
Figure 12:
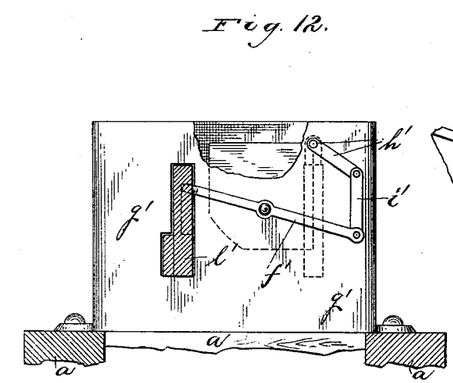
Fig. 12 is a detailed sectional view of the agitator operated by a cam, as seen from the front end of the machine.
Figure 13:
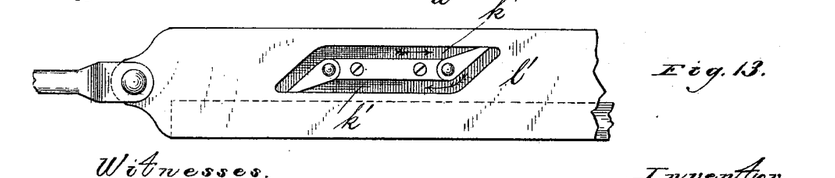
Fig. 13 is a detailed view of the said cam.

The plate or agitator *e'* is designed to be forced up from below to enlarge the pocket that has come up to be filled and at the same time stir up the potatoes, so as to make sure that a sufficient number will fall into the pocket. This plate or agitator is turned back, as shown in Fig. 1, just before the cylinder begins to move forward at each step. The mechanism for operating the said slide *e'* will be readily understood by reference to Figs. 1, 10, 11, 12, and 13. The lever *f'* is pivoted to the front of the casting *g'*, as shown in Figs. 1, 10, and 12. The agitator $e'$ is mounted upon the crank-shaft $h'$, which is connected by the link $i'$ with the lever $f'$. The cam $k'$, provided in the reciprocating slide $l'$, serves to operate the lever $f'$, as shown in Figs. 1, 10, and 12. As the slide $l'$ is reciprocated it is evident that the cam $k'$ will be carried about the end of the lever in the direction indicated by the arrow in Figs. 10 and 13. When the lever $f'$ is in the upper portion of cam $k'$, as indicated in Fig. 12, the agitator $e'$ will be in the position shown in said figure and in the position indicated by the full lines in Fig. 11. It will thus be seen that when the end of the lever in the cam is passing upward the agitator will be moving in, and while the said end of the lever is passing downward in the said cam the said agitator will be moving outwardly. It further appears that while the said end of the lever $f'$ is sliding either in the upper or lower horizontal portions of the cam the agitator $e'$ will remain at rest either in its outward or inward position, as the case may be.

I will now describe the means by which the cylinder is moved step by step.

Figure 15:
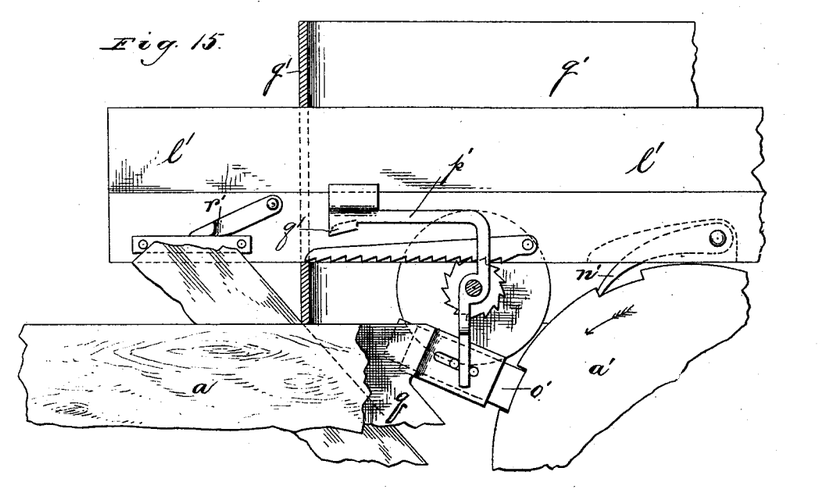
Fig. 15 is a detailed view showing the dog in engagement with the cylinder.
Figure 16:
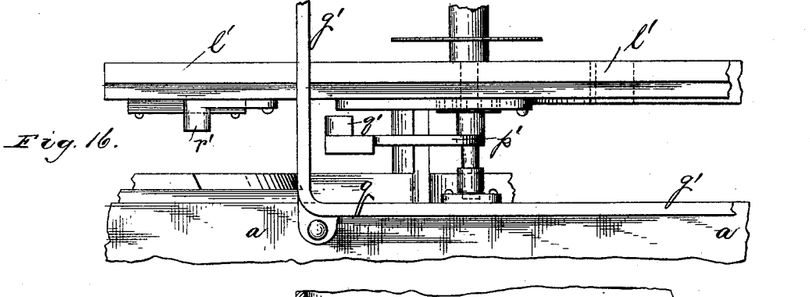
Fig. 16 is a plan view of the mechanism shown in Fig. 15.
Figure 17:
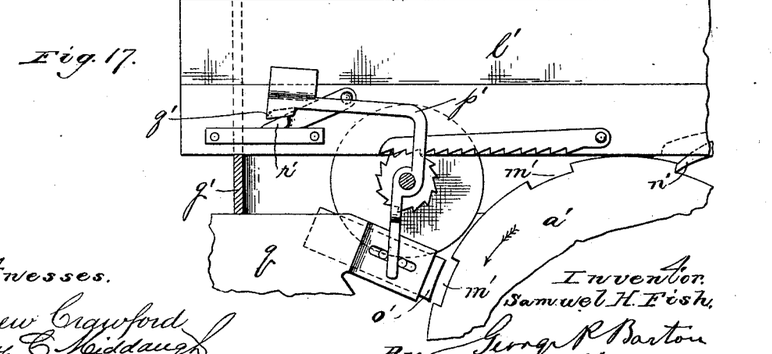
Fig. 17 shows the dog out of engagement with the cylinder.

By reference to Figs. 10, 15, and 17 it will be seen that the cylinder is provided with as many notches $m'$ as there are pockets. The pawl $n'$ is pivoted to the slide $l'$, as shown in Figs. 10 and 15. As the pawl $n'$ engages successively with the notches $m'$, the cylinder will be turned backward—that is, toward the rear of the machine—step by step. The dog $o'$ is operated in its bearing provided in the casting $g$ by means of the weighted bell-crank lever $p'$, as shown in detail in Figs. 15 and 17. It is evident that a spring might be used in place of the weight. While the reciprocating slide $l'$ is moving forward the dog $o'$ will remain in engagement with the cylinder $a'$, as shown in Fig. 15. The lug $q'$, however, will be carried under the movable inclined plane or cam $r'$ as the slide $l'$ is moved forward, and as the slide $l'$ begins to move back toward the rear of the machine the lug $q'$ will be lifted by the cam $r'$, as shown in Fig. 17, thus lifting the dog $o'$ from the notch. The pawl $n'$, at the same time the dog $o'$ is thus lifted, engages with a notch of the cylinder, and the cylinder is thus revolved toward the rear of the machine one step or pocket. The dog $o'$ rests upon the outside of the cylinder while the cylinder is moving, and when the stroke of the slide $l'$ toward the rear is completed the dog $o'$ comes into engagement with the next notch of the cylinder, the weight upon the end of the lever $p'$ being sufficient to keep the dog $o'$ pressed toward the cylinder. The lever $p'$, for convenience, I have mounted upon the shaft which carries the disks. I have shown but three disks upon the shaft. I have found, however, that in practice five disks may be used to advantage. The block or piece $s'$ is attached to the reciprocating slide $l'$, and serves to clear the disks as it is carried forward by the slide.

Referring now to Figs. 1 and 10, it will be seen that I have provided a plate or guide $t'$, which serves to direct the potatoes toward the tongues as they are extended successively and carried forward by the movement of the cylinder.

Figures 18, 20:
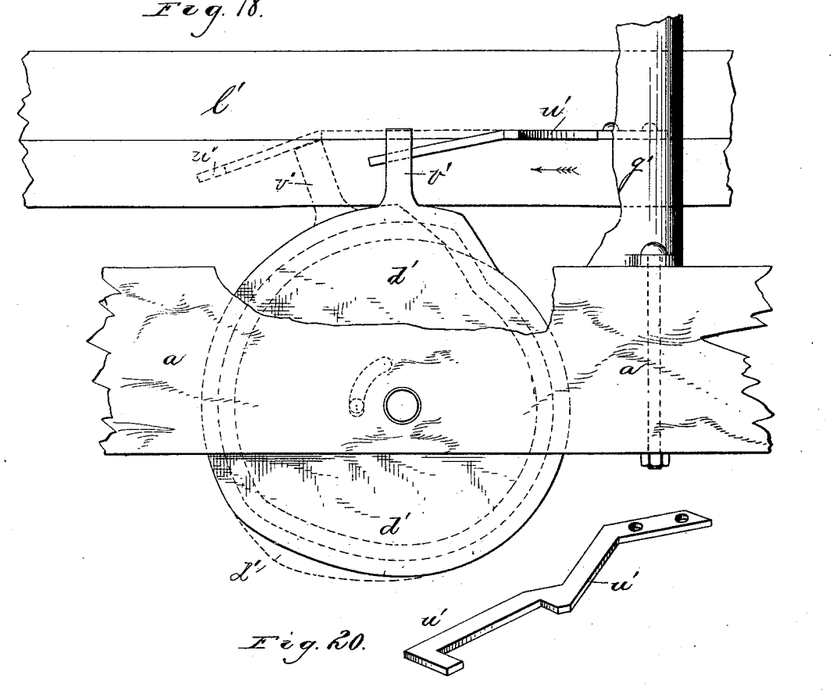
Fig. 18 is a detailed view of the mechanism for moving the cam which operates the tongues.
Fig. 20 is a detailed perspective of the arm or hook for working the cam.

It will be observed that the operation of the several parts of the dropping mechanism is controlled by the reciprocating slide $l'$. Suppose now the machine were in the field in gear and the hopper filled with potatoes. Immediately on starting the machine the sprocket-wheels will be turned and the crank-wheel mounted upon the same shaft with the forward sprocket-wheel will revolve, thus reciprocating the pitman which is connected between the crank-wheel and the reciprocating slide. The reciprocating slide will thus be kept in motion as long as the machine continues to move. We will suppose now that the reciprocating slide has completed its stroke forward and is just starting back toward the rear of the machine. It moves for a short distance—say three-fourths of an inch—before the pawl $n'$ engages with a notch $m'$ of the cylinder. During this time, however, the slide is doing certain work. As will be understood by observing the cam $k'$, (shown in detail by the dotted lines in Fig. 10,) the end of the lever resting in said cam will be carried down as the slide $l'$ moves toward the rear of the machine, and when said slide has completed its stroke to the rear the end of said lever will be found resting in the lower front corner of said cam, as shown in Fig. 10. It is, however, during the first part of the stroke to the rear that the lever is carried down in the cam, and, as before described, when thus carried down the agitator $e'$ is moved outwardly, so as to be out of the way and leave the cylinder clear at the time that the pawl $n'$ takes a notch of the cylinder; and, further, it should be observed that it is during this first part of the stroke to the rear of reciprocating slide $l'$ that the dog $o'$ is lifted from engagement with the cylinder. It will thus be seen that the agitator $e'$ is moved out of the way and the dog $o'$ lifted from engagement with the cylinder just before the pawl $n'$ begins to move the cylinder. The cam $d'$, as shown in Fig. 18, is provided with a groove, (indicated by the dotted lines.) The ends of the levers which operate the tongues are carried about this groove as the cylinder is revolved, as shown more clearly in Fig. 11. As the tongues are carried upward with the cylinder they are successively extended, the groove in the cam being curved toward the center, so as to bring the ends of the levers of the upwardly-moving tongues toward the center or axis of the cam, as shown. The groove of the cam, however, is curved outwardly, so that the tongues may be drawn in successively as they are carried under the potatoes in the hopper, in order that the cylinder may be cleared in front of the pocket that has just been filled before the cylinder begins to move at each step. I provide the piece or hook $u'$, which is attached to and carried with the reciprocating slide, and which engages with the lug $v'$, projecting from the cam, at each stroke of the slide, so as to move the lug and consequently the cam back and forth a short distance—say a little more than one-third the distance the slide moves.

Figure 19:
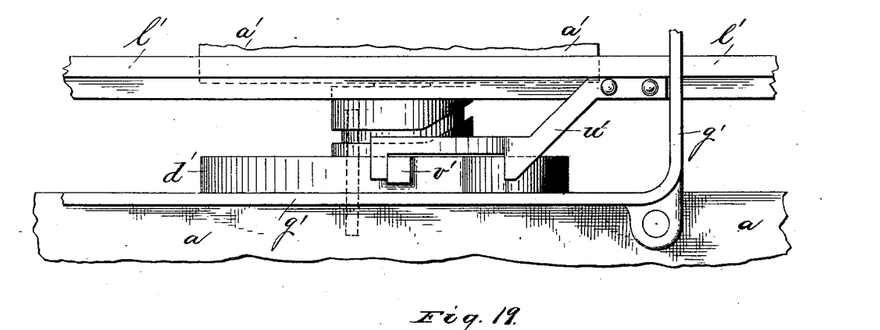
Fig. 19 is a plan view of Fig. 18.

In Fig. 1 the slide $l'$ is shown just as it has completed its stroke to the rear, the lug of the cam being carried back to the position indicated by the dotted lines in Fig. 18. As the hook $u'$ is moved toward the front of the machine the lug $v'$ will be carried to the position indicated by the full lines in Fig. 18, (also indicated in Fig. 19.) Thus during the latter part of the stroke of the slide $l'$ in each direction the cam $d'$ is moved with it. It is when the cam is moved from the position indicated by the dotted lines in Fig. 18 to the position indicated by the full lines in said figure that the tongue most extended is drawn in so as to clear the cylinder before it begins to move, carried by the return-stroke of the slide, as hereinbefore described. The two lugs upon the hook may be placed far enough apart so that the cam-lug coming between them will be moved only the distance required.

It is evident that the form of the hook may be varied, and in fact any means that will do the work may be used to give motion to the cam $d'$.

Having thus described my invention, I claim as new and desire to secure by Letters Patent—

1. The combination, in a potato-planter, of a cylinder and means for driving the same step by step, forks carried by the cylinder and operated by cams, tongues carried by the cylinder and operated by a cam $d'$, and means for moving said cam $d'$ a short distance, whereby the tongue most advanced is drawn back before the cylinder begins to move at each step, substantially as and for the purpose specified.

2. The combination, with the cam $d'$, provided with the lug, of the piece $u'$, carried by the reciprocating slide, whereby the said cam is moved back and forth a short distance as the slide reciprocates, substantially as and for the purpose specified.

3. The combination, in a potato-planter, with a cylinder provided with pockets and means for driving said cylinder step by step, of an agitator turned automatically inwardly to enlarge the pocket that is about to be filled, and means for turning said agitator outwardly just before the cylinder begins to move at each step, substantially as and for the purpose specified.

4. The agitator carried by the crank-shaft, the link and pivoted lever, and the cam $k'$ in the reciprocating slide, whereby the agitator is turned outwardly and inwardly, substantially as and for the purpose specified.

5. The dog $o'$, in combination with the weighted bell-crank lever and the movable cam carried by the reciprocating slide, whereby the dog is disengaged from the cylinder at the beginning of the movement of the slide toward the rear of the machine, substantially as and for the purpose specified.

6. The combination, with the cylinder turned step by step, of the notches $m'$ and the dog or detent $o'$, and means whereby the dog is lifted from one notch and forced into the next notch at each step of the cylinder, substantially as and for the purpose specified.

7. The combination, with the cylinder, of means for moving said cylinder step by step, and the agitator mounted upon the crank-shaft, the pivoted lever operated by cam $k'$, and the link connecting said crank-shaft with the pivoted lever, whereby the pocket that is about to be filled is enlarged and the potatoes caused to fall therein, substantially as and for the purpose specified.

8. The combination, with the slide and means for driving the same back and forth, of the bearings for said slide, provided in the casting which supports the hopper, the cylinder provided with forks and tongues, and mechanism carried by the said slide for giving the cam which operates the tongues a movement at each stroke of the slide, substantially as and for the purpose specified.

9. The combination, with the main lever, of cam $g$, provided thereon, the pivoted bell-crank lever provided with the bifurcated end or clutch which rests in the groove $n$, provided in the hub of a wheel placed upon the main shaft, said wheel, and a clutch secured rigidly to the driving-wheel, whereby the said wheel may be held so as to be driven by said wheel or thrown out of gear therewith, as desired, substantially as and for the purpose specified.

In witness whereof I hereunto subscribe my name this 31st day of October, A. D. 1884.

SAMUEL H. FISH.

Witnesses:
GEORGE P. BARTON,
F. H. McCULLOCH.